Patented Mar. 4, 1924.

1,485,700

UNITED STATES PATENT OFFICE.

CHARLES E. NORTH, OF MONTCLAIR, NEW JERSEY, AND JOHN L. LAYCOCK, OF NORTH PELHAM, NEW YORK, ASSIGNORS TO THE MILK OIL CORPORATION, OF WILMINGTON, DELAWARE, A CORPORATION OF DELAWARE.

EXTRACTING OIL FROM MILK.

No Drawing. Application filed February 28, 1923. Serial No. 621,909.

*To all whom it may concern:*

Be it known that we, CHARLES E. NORTH, a citizen of the United States, residing at Montclair, county of Essex, and State of New Jersey, and JOHN L. LAYCOCK, a citizen of the United States, residing at North Pelham, county of Westchester, State of New York, have invented certain new and useful Improvements in Extracting Oil from Milk, of which the following is a full, clear, and exact description.

In the process heretofore practiced for obtaining a pure oil or fat from milk or cream, there are several special steps to be taken and problems to be solved. The oil or fat itself in natural milk or cream forms part of an emulsion consisting of very small globules which, according to the temperature, are in a semi-solid or solid condition, the milk solids not fat and water. The separation of the oil in this isolated state from the other constituents of the milk calls for measures which will bring about a union, coalesence or adhesion of the fine particles or droplets into larger particles or masses, or into one mass. This union of the scattered fat particles into aggregations or substantially larger masses, is known as the "breaking" of the emulsion.

Such emulsions may be broken or their breaking facilitated by (1) the action on the serum or liquid in which the fat particles are suspended of acids or alkalies, (2) by the dilution of the serum with water, (3) by the effect upon the fat itself of whipping or churning, (4) by the action on both the fat and the serum in which it is suspended by heat, or by (5) evaporation of the water left after the removal of the solid constituents not fat.

In previous applications for Letters Patent the application of these steps or methods for breaking a milk or cream emulsion have been discussed in detail, but we have now discovered another method of accomplishing the same result which is the application of the step of freezing, or, in other words, we have found that the emulsion may be broken by freezing it or exposing it to temperatures sufficiently low to crystallize the water or milk serum.

In the further elaboration of this new process of recovering milk oil we shall discuss cream, but it will be understood that this term includes milk if it be of sufficient richness for practical purposes, and washed cream, or that from which the milk solids not fat have been removed by washing and centrifugal separation.

In the process of freezing cream the change of the liquid portion to a solid state is accomplished by the formation of crystals of ice. In the case of cream, just as in the case of all other mixtures of liquids and solids, the liquid congeals in clear crystals while the solids in suspension are separated from the crystals as each liquid unit from which a crystal is formed discharges its contained solids in the act of freezing. This action is familiar to all students of physics, and results in a crowding together of the fat particles in the cream until the emulsion is entirely broken.

In natural cream, however, all other milk solids not fat are concentrated by the same action, so that the fat particles are surrounded by a mass composed of the other milk solids. This manifestly interferes with the recovery of the fat in a pure state, and hence other steps must be applied as supplementary to the freezing in order to obviate such interference. We have found that the most effective and economical method of getting rid of such solids not fat is to wash the cream by the addition of water and to then pass the dilution through a suitable centrifuge. This dilution and separation may be repeated until a washed cream is obtained which consists almost exclusively of milk fat and water. Such washed cream is admirably adapted to the freezing process. Since, after the water has been congealed into ice crystals, an almost pure fat is gathered and concentrated out of the emulsion.

To obtain this fat free from water and in a pure form, it is only necessary to melt the frozen cream by warming it or by the addition of a relatively small volume of warm water until it is entirely melted. When this occurs, the concentrated fat clings together and coalesces into an oily mass in the remaining water. This mixture may then be passed through a centrifuge constructed for the separation of oil from water such as an ordinary cream or oil separator.

As a practical illustration of the manner in which we have practiced this invention the following specific example may be given:

Ten cans of milk having a fat percentage of 3½ are passed through a cream separator adjusted to deliver from the cream spout one can of cream containing 35% fat and from the skim milk spout nine cans of skim milk with less than 2/100 of 1% fat.

This one can of cream is then mixed or diluted with nine cans of pure water and the dilution passed through the cream separator producing again one can of washed cream containing 35% fat, but only 10% of the original skim milk, since 90% of the latter has been washed away by the water.

This washing process is then repeated producing a doubly washed cream containing less than 1% of its original skim milk and the same percentage of fat and water.

This washed cream is then frozen in any suitable container, such as a milk can, an ice cream freezer or any other suitable receptacle, tank or vat to such an extent that the emulsion is broken and all of the water, converted from a fluid to a crystalline state, has left the fat in gathered and concentrated masses by itself.

This frozen cream is then melted by placing the can in warm water or by the addition to it of a relatively small volume of warm water, or by any other suitable and convenient means.

The melted cream in any suitable form of tank or vat is then diluted with, preferably, about three or four times its volume of water at a temperature above the melting point of the fat to wash from the fat any minute particles of solids not fat that may still remain.

This mixture is then passed through any form of centrifuge that will separate oil from water with the result that a pure clear oil will be delivered from the oil spout of such machine.

This method of extracting oil from milk or cream has proved most efficient and economical. It requires for its performance no new or untried devices, machines or utensils, and the oil obtained is practically pure and free from water.

What we claim as our invention is:

1. The process herein described of extracting pure oil from milk which consists in separating the cream from the skim milk, washing the cream, freezing the washed cream, melting the frozen cream and separating out the water from the resulting mixture.

2. The process herein described, of extracting pure oil from milk, which consists in separating the cream from the skim milk, washing the cream, freezing the washed cream, melting the frozen cream, adding water to the melted mixture and then separating the water from the oil.

3. The steps in the process of extracting pure oil from milk herein described, which consists in freezing the cream from such milk to such an extent that the water or milk serum is separated from the fat constituents by crystallization and the emulsion thereby broken, melting the frozen cream and separating the water from the segregated fat.

4. The process herein described, of extracting oil from milk, which consists in washing the cream obtained therefrom, freezing the washed cream, melting the same, adding water of a temperature above the melting point of the fat, and then passing the mixture through a centrifuge to separate the water from the fat.

5. The process herein described, of extracting oil from cream which consists in removing from the cream the milk solids not fat, freezing the same to such an extent that the water or milk serum is separated from the fat by crystallization and the emulsion broken, concentrating the fat to a degree which permits its separation in a pure form when melted and passing the mixture through a centrifuge to separate the water from the fat.

In testimony whereof we hereto affix our signatures.

CHARLES E. NORTH.
JOHN L. LAYCOCK.